United States Patent [19]

Meador

[11] Patent Number: 5,720,232
[45] Date of Patent: Feb. 24, 1998

[54] METHOD AND APPARATUS FOR RECOVERING CONSTITUENTS FROM DISCARDED TIRES

[76] Inventor: William R. Meador, 1031 Andrews Hwy., Suite 310, Midland, Tex. 79701

[21] Appl. No.: 678,825

[22] Filed: Jul. 10, 1996

[51] Int. Cl.[6] ..................................................... F23G 5/12
[52] U.S. Cl. .......................... 110/346; 110/229; 110/257; 110/109; 110/110
[58] Field of Search ................... 110/227, 229, 110/257, 293, 109, 110, 114, 346, 286

[56] References Cited

U.S. PATENT DOCUMENTS

| | | | |
|---|---|---|---|
| 2,331,907 | 10/1943 | Harrington | 110/109 X |
| 3,559,823 | 2/1971 | Ostrin . | |
| 3,729,105 | 4/1973 | Huebler et al. . | |
| 4,401,402 | 8/1983 | Casperson . | |
| 4,602,572 | 7/1986 | Giaier et al. | 110/110 X |
| 5,411,714 | 5/1995 | Wu et al. | 110/229 X |

*Primary Examiner*—Henry A. Bennett
*Assistant Examiner*—Susanne C. Tinker
*Attorney, Agent, or Firm*—Milburn & Peterson, P.C.

[57] ABSTRACT

Discarded rubber tires for reclamation and recovery of the constituents therein and/or environmentally safe disposal are transferred from a pan feeder system into a hopper and transferred by an auger into a pyrolysis chamber. The pan feeder system excludes air or oxygen from passing through the hopper and auger into the pyrolysis chamber. Tire pieces from the pan feeder system are transferred by an auger through the pyrolysis chamber which is heated to a temperature between 350° and 650° F. The pyrolysis chamber includes a vapor recovery system for removing the vapors and maintaining a vacuum in the pyrolysis chamber. The vapors are withdrawn through a heat exchanger and into a liquid/gas separator where the condensed liquids are removed and the gas is recycled for fuel or other disposition. The solid residue from the tire pyrolysis is transferred by a closed auger to a closed bin. A pressure sensitive switch on the bin starts and stops the motor on an auger to discharge the solid residue for further processing, and thus maintains a minimum level of solid residue in the bin which acts as a seal to prevent air or oxygen from entering the pyrolysis chamber through the closed bin and closed auger. The solid residue is primarily carbon and steel which may be further separated by suitable equipment.

18 Claims, 2 Drawing Sheets

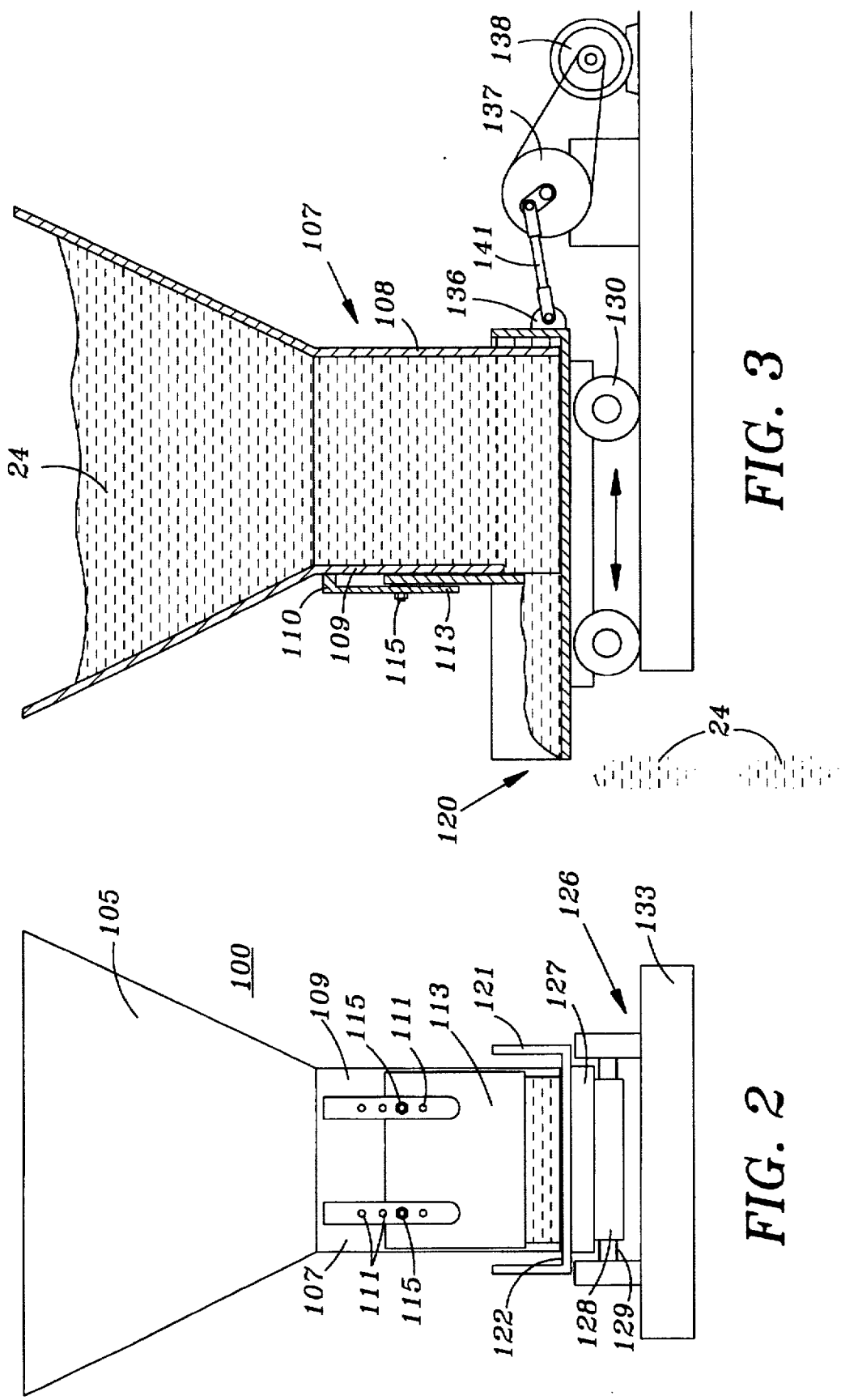

METHOD AND APPARATUS FOR RECOVERING CONSTITUENTS FROM DISCARDED TIRES

FIELD OF THE INVENTION

This invention concerns a method and apparatus for processing discarded tires to recover the constituents thereof in the form of carbon, steel, and oils and gases.

BACKGROUND OF THE INVENTION

An apparatus and methods are known in which discarded tires are macerated or otherwise cut up into small pieces in the neighborhood of three or four inches for processing in a pyrolysis chamber under a slight vacuum in an oxygen free atmosphere. Various apparatus and methods are hereafter described.

U.S. Pat. No. 4,084,521, issued to Herbold, et al shows a method and apparatus for pyrolysis of waste products such as tires. The apparatus includes a charging hopper that has two air tight chambers connected one after another to form an airlock. Also, a door or delivery flap is biased by counter-weight in order to crush practically all of the residual material before it can drop past a delivery flap.

U.S. Pat. No. 4,240,587, issued to Letsch teaches a recycle method to recover useable components in recycling tires. The process includes cryogenic treatment to render the tires very brittle, then they are crushed, the metal separated and then rubber is pyrolytically reacted. The process produces high energy gases, soots and scrap metal.

U.S. Pat. No. 4,648,328, issued to Keough is another apparatus and process for pyrolysis of tires. The process includes an airlock system for entry and exit of the tires and the solid residue, respectively. The inlet end of the reaction chamber is elevated relative to the outlet end, so that the reaction chamber floor over which the fragments travel is at approximately the angle of repose of the tire fragments. The gases and oils from the process are separately collected. The solids discharged are passed to a floatation unit for separating carbon, which floats, from steel, which sinks.

U.S. Pat. No. 4,759,300, issued to Hansen teaches a method for pyrolysis of dried waste products which employs a microwave generator for preheating the waste products which are then introduced into a pyrolytic chamber containing an oxygen free atmosphere. Initially the reaction chamber is ignited with a laser beam until sufficient methane has been generated. The process discloses an airlock, and also, means by which the double retort can be evacuated or charged with carbon dioxide to maintain a substantially oxygen free atmosphere.

U.S. Pat. No. 4,846,082, issued to Marangoni teaches a pyrolysis of whole tires. The retort used for pyrolysis has a stationary bottom of frustum of cone shaped coaxially communicating with the combustion air duct. The patent is directed primarily to the design of the combustion chamber for tires as aiding complete combustion of waste tires.

SUMMARY OF THE INVENTION

This invention provides an improved process and apparatus for reclamation of discarded tires and recovering the constituents thereof in the form of carbon, steel, and oil and gases. The process includes pyrolysis of discarded tires that have been macerated into tire pieces in an efficient and economical process. The process comprises continually introducing the tire pieces, by a pan feeder, into a water sealed inlet auger, and thus, into a pyrolysis chamber. The solid components exiting from the pyrolysis chamber are conveyed by an auger into a hopper which maintains a depth of solid material sufficient to seal the outlet by the use of a Bin-Dicator® sensor to activate an auger for discharging the solid material from the hopper. The pyrolysis chamber is maintained under a slight vacuum to withdraw the off-gases for further processing to recover liquid and gaseous constituents of the tires from the pyrolysis chamber in a vapor recovery system, the off-gases from the pyrolysis chamber are sent through a heat exchanger to condense the liquids and the gases, and the gases and liquids flow into a liquid/gas separator with a vacuum pump to pull the gases from the liquid/gas separator and provides the slight vacuum to the pyrolysis chamber.

It is an object of the invention to provide a method and apparatus for recovering components from discarded tires using a system of augers to transport tires into a vacuum sealed pyrolysis chamber under vacuum with an inlet water seal and an outlet dry seal.

It is another object of the invention to provide the water sealed inlet to the pyrolysis chamber with a pan feeder to control the input rate of discarded tires to the water sealed inlet feed system for the pyrolysis chamber.

It is another object of the invention to provide an auger controlled outlet system for the pyrolysis chamber which discharges the solid components of the discarded tires utilizing a Bin-Dicator® sensor for controlling the discharge rate of the solid components recovered from discarded tires.

It is another object of the invention to provide an inlet auger, a pyrolysis chamber auger and discharge auger system for discarded tire pyrolysis process.

BRIEF DESCRIPTION OF THE DRAWINGS

In the drawings,

FIG. 2 is a front view of a hopper and pan feeder for transferring the used tires into the inlet system of the pyrolysis chamber illustrated in FIG. 1; and FIG. 3 is a side view, partly in section, of the hopper and pan feeder illustrating the drive mechanism for reciprocating the pan feeder.

DESCRIPTION OF PREFERRED EMBODIMENT

Figure 1:
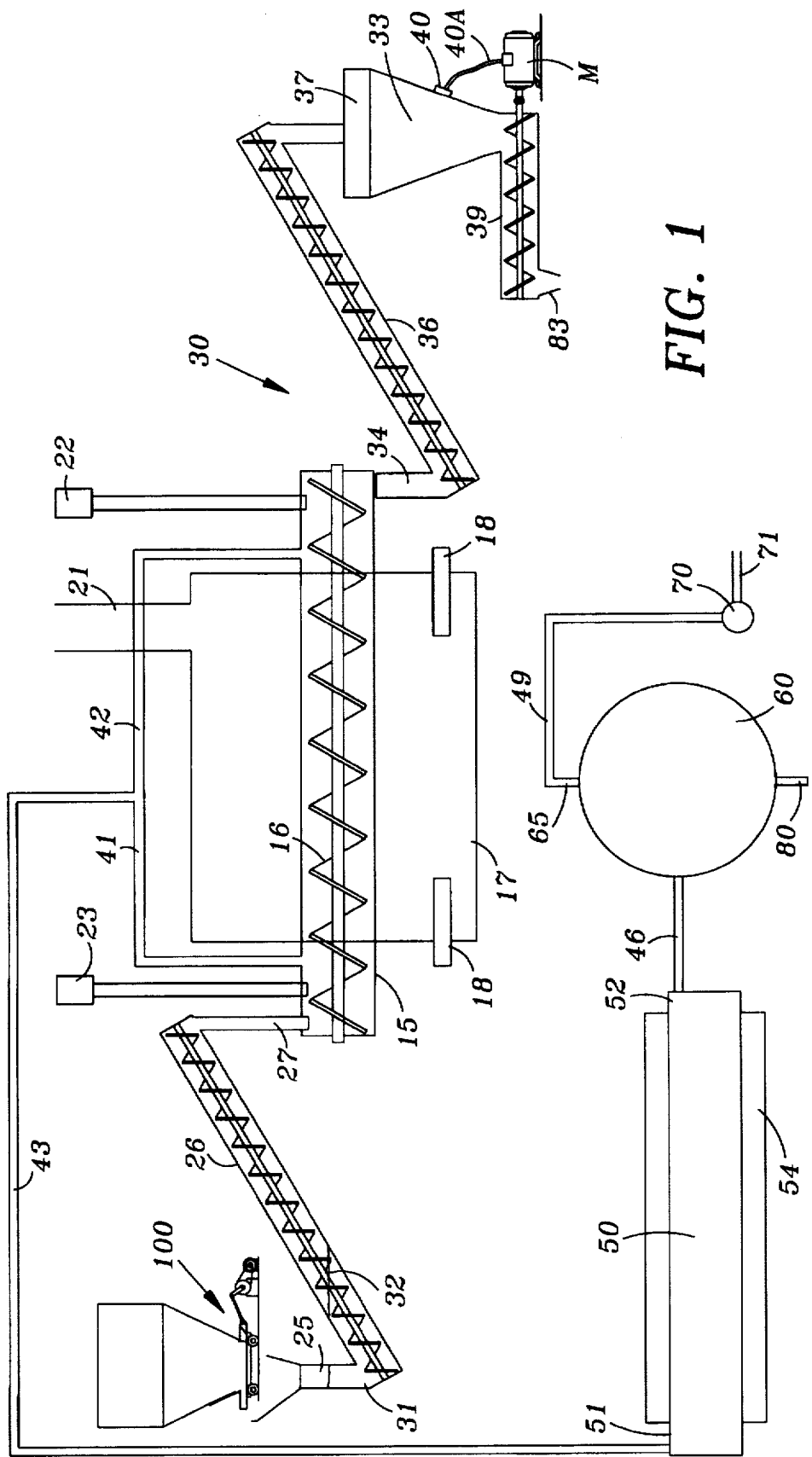
FIG. 1 is a schematical representation of the overall pyrolysis system and apparatus for processing discarded tires and recovering the constituents thereof.

Referring now particularly to FIG. 1, there is illustrated apparatus suitable for performing the pyrolysis process. The apparatus for performing the process includes a tubular pyrolysis chamber 15 which has a screw conveyor 16 for transferring macerated tire pieces 24 through the heated zone for pyrolysis. A furnace or heating oven 17 surrounds and extends along the pyrolysis chamber 15. Furnace 17 has a pair of burners 18 which may be fired by gas or other fuel. The off-gas from furnace 17 exits through flue 21. Pyrolysis chamber 15 is provided with a pair of pop off valves 22 and 23 for safety reasons. The tire pieces 24 from pan feeder system 100 are continuously placed in feed hopper 25 which is partially filled with liquid 31. Attached in sealing arrangement with the hopper 25 is feed auger 26 which transfers the tire pieces 24 into inlet chute 27 and then into pyrolysis chamber 15. A liquid 31, such as, water is maintained at a level 32 in the hopper 25 and feed auger 26 to exclude oxygen or air entering into the pyrolysis chamber 15.

The solid material 33, which is mostly carbon and steel, remaining after pyrolysis is discharged from pyrolysis chamber 15 through a housing 34 into an outlet auger 36 which transfers the solid material 33 into a closed bin 37. Closed bin 37 is designed with pressure sensitive switch 40 connected to motor M by a wire 40A. When the pressure sensitive switch 40 senses a preselected maximum pressure in closed bin 37, it sends a signal through wire 40A to activate motor M which operates screw conveyor 39 to discharge the solid material through transfer chute 83 for later separation of the carbon and steel tire components. When pressure sensitive switch 40 senses a preselected minimum pressure in closed bin 37, it sends a signal through wire 40A to deactivate motor M. This arrangement effects a seal of closed bin 37 which excludes air or oxygen entering pyrolysis chamber 15 from closed bin 37 through outlet auger 36 and housing 34. Feed auger 26 maintains a pressure seal in the inlet to pyrolysis chamber 15 and closed bin 37 maintains a pressure seal in the outlet from pyrolysis chamber 15.

Flow lines 41 and 42 connect opposite ends of pyrolysis chamber 15 and join flow line 43 which leads to heat exchanger 50. Flow line 46 connects heat exchanger 50 to liquid/gas separator 60. Flow line 49 leads to a vacuum pump 70 which provide a negative pressure in pyrolysis chamber 15. Heat exchanger 50 has an inlet 51 and an outlet 52. Cooling jacket 54 (schematically depicted) surrounds heat exchanger 50 for condensing liquids from the vapor stream. Heat exchanger 50 is elevated at inlet 51 to ensure that all of the liquid condensed in heat exchanger 50 is transferred through line 46 to separator 60. Separator 60 includes a float valve (not shown) which controls the discharge liquid through line 80. The gaseous components of the off-gas exit the separator 60 at gas outlet 65 through line 49 through vacuum pump 70, and returned through line 71 as fuel to burners 18 or otherwise disposed of. Vacuum pump 70 maintains a slight vacuum in pyrolysis chamber 15.

Referring to FIG. 2 and FIG. 3 which illustrate the details of the pan feeder system 100, the hopper or feed bin 105 includes a chute section 107 which is designed with three side walls 108 of fixed length and a fourth substantially short wall 109 which is substantially shorter than side walls 108. Short wall 109 has a bracket 110 with a series of apertures 111. A closure panel 113 is held in place flush to short wall 109 by bolts 115 to adjust the effective length of short wall 109 relative to side walls 108. A reciprocating dolly 120 has an upper body 121 in the shape of a channel mounted upon an undercarriage 126. Upper body 121 is mounted on spacer plate 127 of undercarriage 126. An axial housing 128 is attached to the bottom side of spacer plate 127 and carries axials 129 which mount wheels 130. The upper body 121 of dolly 120 is approximately twice the length of side walls 108 of chute section 107. Wheels 130 of dolly 120 are seated on floor 133 such that side walls 108 are in close proximity with face 122. Dolly 120 is provided with a coupler 136. A pulley 137 mounted from floor 133 is driven by motor 138. The pulley 137 is attached to a connecting rod 141 in a well known manner to impart reciprocal motion to dolly 120 upon activation of motor 138.

In a typical operation for recovery and reclamation of various constituents of the discarded tires, as illustrated in FIG. 1, the various tire pieces 24 would be intermittently fed into input feed hopper 25 and transferred through the liquid 31 by feed auger 26 into feed chute 27 and into the pyrolysis chamber 15. Typically, the discarded tires are macerated to approximately three inch by three inch pieces. The tire pieces 24 are deposited into screw conveyor 16 in pyrolysis chamber 15 which transfers the tire pieces 24 through pyrolysis chamber 15 surrounded by furnace 17 and solid material 33 remaining after pyrolysis is transferred through housing 34 into outlet auger 36 and into closed bin 37. Closed bin 37 has a pressure sensitive switch to start and stop motor M and screw conveyor 39 for maintaining a minimum level of solid material 33 in closed bin 37, thereby sealing closed bin 37 to exclude air or oxygen flowing through the collection system 30 into the pyrolysis chamber 15.

The off-gases from the pyrolysis chamber 15 are passed through vacuum lines, through heat exchanger 50 and liquid/gas separator 60 through the vacuum pump 70 and returned to burners 18. The liquids separated in the liquid/gas separator 60 are discharged through a float controlled valve (not shown) into line 80 for storage or further use or disposal.

The solid material 33 is transferred to transfer chute 83 by screw conveyor 39 and discharged through transfer chute 83 for other processing.

In the typical operation for processing discarded tires, the tires and the reinforcing wires therein are macerated into approximately 2×3" pieces. Pan feeder system 100 is operated at a rate to feed 16 to 33 lbs. per minute of tire pieces 24 into hopper 25. The feed auger 26 is approximately 14" in diameter and operated at 150 RPM. Screw conveyor 16 in pyrolysis chamber 15 is approximately 24" in diameter and runs at 4 to 7 RPM which provides a retention time of the tire pieces 24 in pyrolysis chamber 15 between 7 to 10 minutes. Solid material 33 is discharged from pyrolysis chamber 15 through housing 34 into outlet auger 36 which is approximately 12" in diameter and runs at 175 RPM. The solid material 33 is discharged into closed bin 37 which is designed with pressure sensitive switch 40. The pressure sensitive switch 40 is triggered at 150 lbs. pressure to activate motor M, to drive screw conveyor 39 to discharge the solid material through transfer chute 83 and cut off when the pressure drops to 30 lbs. A typical pressure sensitive switch is sold under the Trademark Bin-Dicator®. A vacuum of approximately ½" of mercury provides an oxygen free, slightly negative pressure in pyrolysis chamber 15. Heat exchanger 50 has an inside tube 12" in diameter and the outside is 24" in diameter and a 20 HP high volume fan is used to blow air in and around the 12" tube to discharge as much heat as possible. Feed hopper 105 and chute section 107 holds 4000 lbs or two hours of operation. In the pan feeder system, the chute section 107 is approximately 18" square at the bottom and the overall height of the hopper 105 and chute 107 is 10', and the hopper 105 has a 10×10' opening at the top. Closed bin 37 is approximately 12" square at the bottom and 3×3' at the top and approximately 7' tall.

Approximately 105 tires equals about 2000 lbs of tire pieces and the system is designed to produce approximately 150 gallons or 1050 lbs of oil, 700 lbs of carbon black, 200 lbs of steel and 50 lbs of off-gas under relatively ideal conditions.

The pyrolysis chamber 15 would typically be operated in a temperature range between 350° to 650° F.

The vacuum pump 70 maintains a vacuum on pyrolysis chamber 15 of approximately one-half inch of mercury.

The pressure sensitive switch to operate a discharge valve (not shown) may be obtained from any material sales store, under U.S. Registered Trademark BIN-DICATOR®, as utilized in collection system 30 of FIG. 1, to maintain the desired level of solid material 33 collected in closed bin 37 to ensure the system is sealed from air and oxygen entering the pyrolysis chamber.

It will be understood that the preferred embodiment of the invention has been disclosed and that other changes and modifications would be suggested which are within the scope of this invention.

What is claimed is:

1. Apparatus for reclamation and recovery of constituents of discarded vehicle tires cut into pieces including organic and inorganic materials for reuse or environmentally safe disposal comprising:

(a) a heating oven;
 (b) an elongated pyrolysis chamber having a decomposition zone, an inlet and an outlet positioned within said heating oven for decomposition of the discarded vehicle tire pieces into vapor and solid material, said pyrolysis chamber having an auger for transferring the tire pieces from the inlet through said decomposition zone and the solid material from said decomposition zone to the outlet;
 (c) a feed system for transferring tire pieces for reclamation to the inlet of said pyrolysis chamber including:
  i. a feed hopper,
  ii. a closed inclined feed conveyor coupled between the bottom of said feed hopper and the inlet of said pyrolysis chamber for transferring the tire pieces from the feed hopper to the inlet of said pyrolysis chamber,
  iii. said feed system including a water sealing arrangement for excluding the atmosphere from entering said pyrolysis chamber through the feed conveyor;
 (d) a solid material recovery system including:
  i. a recovery bin for collecting the solid material from the outlet of the pyrolysis chamber,
  ii. an outlet conveyor for transferring the solid material to said recovery bin from said pyrolysis chamber, and
  iii. said solid material recovery system having a sealing system for excluding the atmosphere from entering the pyrolysis chamber through said solid material recovery system;
 (e) a vapor recovery system for recovering vapors from the decomposition zone of said pyrolysis chamber including:
  i. a heat exchanger for condensing vapors from said pyrolysis chamber,
  ii. a liquid/gas separator for separating liquids condensed in said heat exchanger, and
  iii. a vacuum pump for removing vapors from the decomposition zone of said pyrolysis chamber through said heat exchanger and said liquid/gas separator and maintaining a vacuum in said pyrolysis chamber.

2. The apparatus of claim 1 wherein said sealing arrangement for said feed system comprises maintaining water within the lower ends of said feed hopper and said conveyor.

3. The apparatus of claim 1 wherein the sealing system for the solid material recovery system includes a pressure sensitive mechanism secured to said recovery bin for activating a discharge conveyor for maintaining a solid material between a maximum and minimum level in said recovery bin.

4. The apparatus of claim 1 wherein said sealing arrangement for said feed system includes maintaining water within the lower ends of said feed hopper and screw conveyor and wherein said sealing system for the solid material recovery system includes a pressure sensitive mechanism secured to said recovery bin for activating a discharge screw conveyor for maintaining a solid material between a maximum and minimum level in said recovery bin.

5. The apparatus of claim 1 wherein the feed conveyor is an auger.

6. The apparatus of claim 1 wherein the outlet conveyor is an auger.

7. A process for reclamation and recovery of constituents of discarded vehicle tires cut into pieces for reuse or environmentally safe disposal comprising:

transferring tire pieces from a feed bin by a reciprocating dolly forming the bottom of the feed bin into a feed hopper;
 transferring the tire pieces from the feed hopper to the inlet of a pyrolysis chamber by a feed conveyor;
 maintaining water within the feed hopper and conveyor for excluding the atmosphere from entering into the pyrolysis chamber through the feed conveyor;
 transferring said tire pieces with an auger through said pyrolysis chamber;
 heating the tire pieces to a temperature sufficient to decompose the tire pieces in the pyrolysis chamber;
 discharging the resulting solid materials from the pyrolysis chamber through a outlet conveyor into a recovery bin;
 retaining a limited amount of solid materials in the recovery bin that excludes the atmosphere from passing through the recovery bin into the pyrolysis chamber;
 maintaining a vacuum in said pyrolysis chamber sufficient to remove vapors during said decomposition;
 condensing said vapors in a heat exchanger to obtain liquid and gaseous material;
 separating said liquid from said gaseous material in a liquid/gas separator;
 withdrawing said liquids from said liquid/gas separator; and
 removing said vapors from said liquid/gas separator through a vacuum system for recovery and reuse.

8. The process of claim 7 wherein the feed conveyor is an auger.

9. The process of claim 7 wherein the outlet conveyor is an auger.

10. The process of claim 7 wherein the tire pieces are heated to a temperature between 350° to 650° F. in the pyrolysis chamber.

11. The process of claim 7 wherein the vacuum maintained in the pyrolysis chamber is about one-half to one inch of mercury.

12. The process of claim 7 wherein the tire pieces are heated in the pyrolysis chamber to a temperature between 350° to 650° F. and the vacuum is about one-half to one inch of mercury.

13. Apparatus for reclamation and recovery of discarded vehicle tires including organic and inorganic materials for reuse or environmentally safe disposal comprising:

(a) a heating oven;
 (b) an elongated pyrolysis chamber, having a decomposition zone, an inlet and an outlet, positioned within said heating oven for decomposition of the tire pieces into vapor and solid material, said pyrolysis chamber having a screw conveyor for transferring tire pieces from the inlet through said decomposition zone and the solid material from said decomposition zone to the outlet;
 (c) a feed system for transferring the tire pieces for reclamation to the inlet of said pyrolysis chamber including:

i. a feed bin,
  ii. a reciprocating dolly forming the bottom of the feed bin for supplying tire pieces at a desired rate into the input feed hopper,
  iii. an inlet conveyor for transferring the tire piece from the input feed hopper to the inlet of said pyrolysis chamber,
  iv. said feed system including a water sealing arrangement for excluding the atmosphere from entering said pyrolysis chamber through the feed system;

(d) a solid material recovery system including:
  i. a recovery bin for collecting the solid material from the outlet of the pyrolysis chamber,
  ii. an outlet conveyor for transferring the solid material from the outlet of said pyrolysis chamber to said recovery bin, and
  iii. said solid material recovery system having a sealing system for excluding the atmosphere from entering the pyrolysis chamber through said solid material recovery system;

(e) a vapor recovery system for recovering vapors from the decomposition zone of said pyrolysis chamber including:
  i. a heat exchanger for condensing vapors from said pyrolysis chamber,
  ii. a liquid/gas separator for separating liquids condensed in said heat exchanger, and
  iii. a vacuum system for removing vapors from the decomposition zone of said pyrolysis chamber through said heat exchanger and said liquid/gas separator and maintaining a vacuum in said pyrolysis chamber.

14. The apparatus of claim 13 wherein the decomposition zone is maintained between 350° to 650° F.

15. The apparatus of claim 13 wherein the vacuum maintained within the pyrolysis chamber is about one-half to one inch of mercury.

16. The apparatus of claim 14 wherein the vacuum maintained within the pyrolysis chamber is about one-half to one inch of mercury.

17. The apparatus of claim 13 wherein the sealing arrangement for excluding the atmosphere from entering said pyrolysis chamber through the feed system includes a water maintained at a level in the feed hopper and the inlet conveyor to seal the feed system.

18. The apparatus of claim 17 wherein the sealing system for excluding the atmosphere from entering the pyrolysis chamber through said solid material recovery system includes an auger for discharge of solid material from said recovery bin intermittently operated by a pressure control switch for activating and deactivating the auger to maintain the solid material between a maximum and minimum quantity in the recovery bin that excludes the atmosphere from entering the pyrolysis chamber through the solid material recovery system.

* * * * *